INVENTOR.
OTTO HENNING
BY
ATTORNEY

March 1, 1955  O. HENNING  2,703,229
FUEL SUPPLY CHAMBER FOR MULTIBARREL CARBURETORS
Filed Nov. 6, 1951  4 Sheets-Sheet 3

INVENTOR.
OTTO HENNING
BY
*George R. Ericson*
ATTORNEY

March 1, 1955  O. HENNING  2,703,229
FUEL SUPPLY CHAMBER FOR MULTIBARREL CARBURETORS
Filed Nov. 6, 1951  4 Sheets-Sheet 4

*INVENTOR.*
OTTO HENNING
BY
ATTORNEY

United States Patent Office 2,703,229
Patented Mar. 1, 1955

2,703,229

FUEL SUPPLY CHAMBER FOR MULTIBARREL CARBURETORS

Otto Henning, Normandy, Mo., assignor to Carter Carburetor Corporation, St. Louis, Mo., a corporation of Delaware Application November 6, 1951, Serial No. 255,005

5 Claims. (Cl. 261—23)

This invention relates to carburetors for internal combustion engines and consists particularly in a novel arrangement of the constant level chamber and fuel discharge nozzles in a carburetor having at least four barrels arranged in a compact group.

It has been suggested to construct a four-barrel carburetor having a forward main pair of mixture conduits, and a rear, auxiliary pair of mixture conduits with throttling arrangements such that the auxiliary mixture conduits are opened to the engine intake manifold during high speed operation when large carburetor capacity is needed. The auxiliary conduits or barrels may be cut off at low speeds so as to concentrate the total engine suction on the forward main pair of mixture conduits. Usually, separate constant level chambers are provided for the forward and rear pairs, although the two chambers may merge in a single concentric structure with or without central dividing partitions.

In such an arrangement, the fuel in the auxiliary bowl may stand for long periods without use, during which time the fuel may evaporate excessively, causing an undesirable delay to fill the bowl before the auxiliary barrels can start to function, or solid matter may settle or form therefrom so as to foul the metering jets and other parts within this bowl. Moreover, the large fuel capacity in the two bowls is subject to excessive surging when the vehicle changes speed or direction. Still another disadvantage is that the main fuel nozzles for supplying the auxiliary pair of mixture conduits extend forwardly from the rearward fuel bowl so that when these auxiliary conduits are in operation a sudden acceleration may cause starving of the auxiliary fuel conduits just when their extra capacity is needed.

I have discovered that the operation of such a four-barrel compound carbuertor will be much improved if all of the fuel for the four barrels is supplied from a single bowl which is substantially smaller in capacity than the dual bowls heretofore provided. In my preferred arrangement, the constant level chamber extends approximately halfway around the front and sides of the group of four downdraft mixture barrels and, while the main nozzles extending into the forward pair of mixture conduits extend rearwardly as customary, the main nozzles discharging into the auxiliary mixture conduits also extend rearwardly and somewhat inwardly so that upon acceleration the charge through the auxiliary mixture conduits will be desirably increased instead of starved, as was the case heretofore. Moreover, surging and tilting within the smaller bowl volume is effectively reduced.

Consequently, the object of the present invention is to overcome the above disadvantages and to provide a novel fuel bowl and discharge nozzle arrangement for a four-barrel carburetor.

This object and other detailed objects hereafter appearing are attained by the device illustrated in the accompanying drawings in which.

Figure 1:
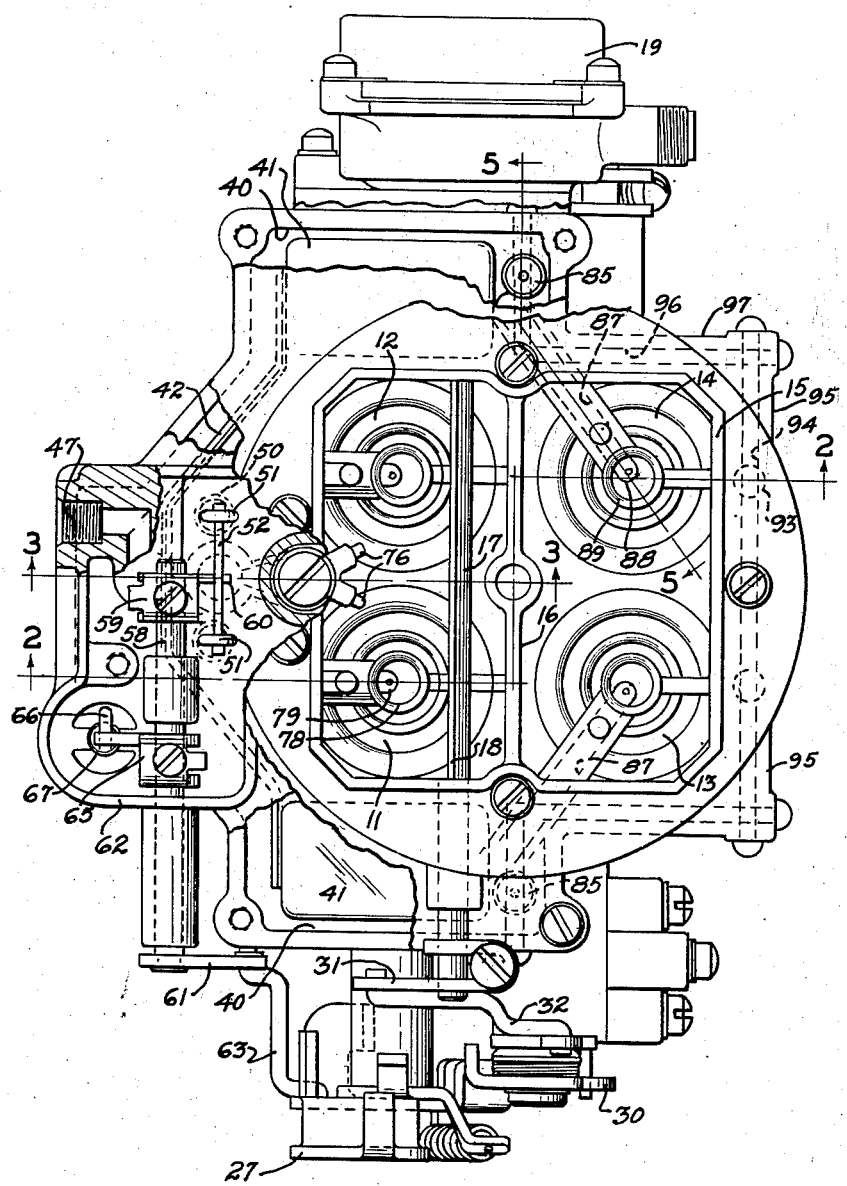
Fig. 1 is a top view of a four-barrel carburetor embodying the invention, portions being broken away and underlying parts sectioned for clearer illustration.

The main body portion 10 of the carburetor includes a group of four compactly arranged downdraft mixture conduits including a main forward pair 11 and 12 and an auxiliary rear pair 13 and 14. All the barrels merge in a single air inlet horn 15, shown square with chamfered corners, for attachment, of the usual air cleaner (not shown). A partition 16 extends partially into the air horn portion 15 and a shaft 17 traversing the air horn forwardly of the partition mounts a rectangular choke valve 18. One end of the shaft extends into an automatic choke control housing 19 which may contain thermo-suction choke control mechanism as disclosed, for instance, in Coffey Patent No. 2,325,372 and Read Patent No. 2,499,607.

Traversing the lower portions of each pair of barrels are throttle shafts 20 and 21 mounting individual throttle disks as at 22 and 23 in each barrel. The pairs of mixture conduit barrels are connected at their lower extremities by slots 24 and 25. The body at its lower extremity is provided with a flange 26 for attachment to the engine intake manifold (not shown). At the lefthand end of throttle shaft 20 (Fig. 4), there is provided an arm 27 having apertures 28 for connection, selectively, through linkage to the accelerator pedal. This arm carries an adjusting screw 29 for engaging a fast idle cam 30, connected to choke valve shaft 17 and arm 31 thereon by link 32.

Figure 6:
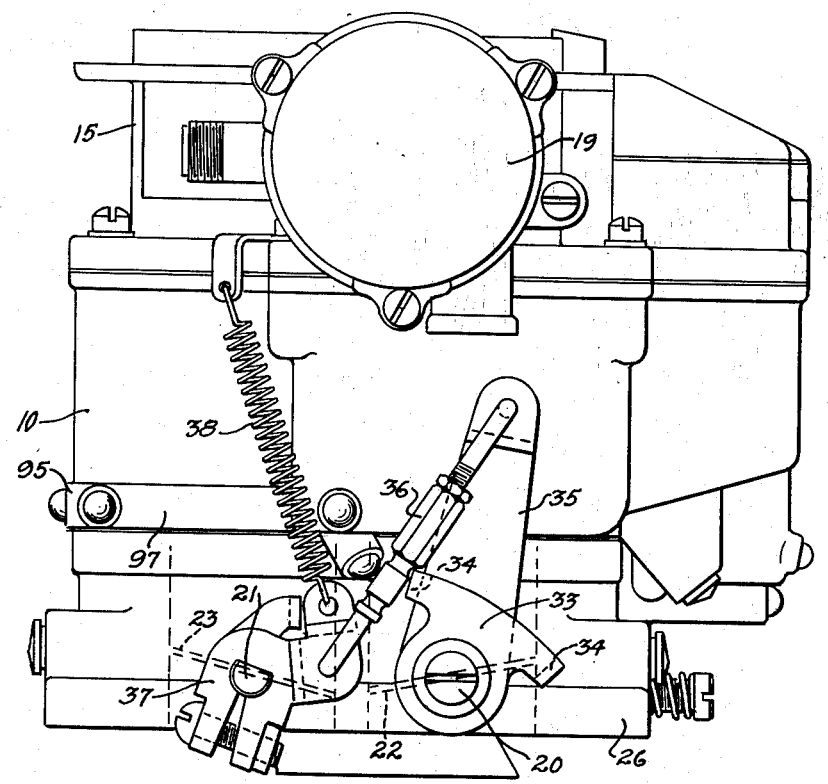
Fig. 6 is an elevation showing the side of the carburetor opposite to that shown in Fig. 4.

The pairs of throttle valves may be connected for sequential operation in the manner shown in Fig. 6. An arm 33 rigid with main throttle shaft 20 has laterally spaced ears 34 for constituting a lost motion driving connection to a lever 35 loosely journalled about shaft 20. Lever 35 is connected by an adjustable link 36 to an arm 37 secured to auxiliary throttle shaft 21 so that after the main throttle valves 22 are opened a certain extent, say one-half opened, auxiliary throttle valves 23 start to open mechanically. A tension spring 38 normally tends to close the auxiliary throttles. If desired, flow actuated valves may be provided in the auxiliary barrels 13 and 14, either anterior or posterior to manual throttle disks 23, for cutting off these auxiliary barrels at low flows.

Figure 2:
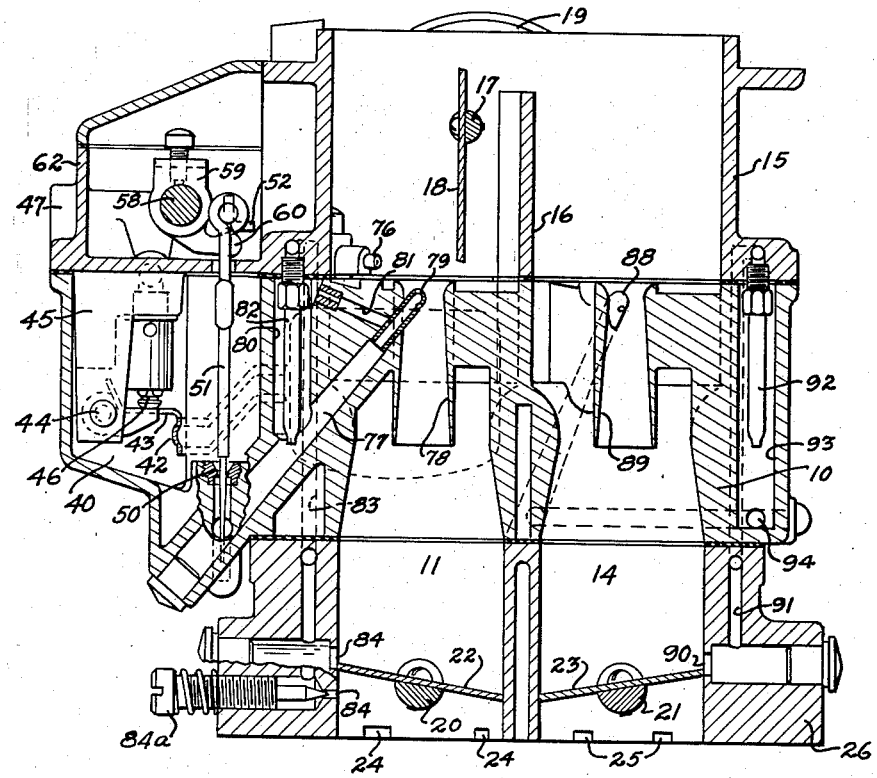
Fig. 2 is a transverse vertical section taken on broken line 2—2 of Fig. 1.
Figure 3:
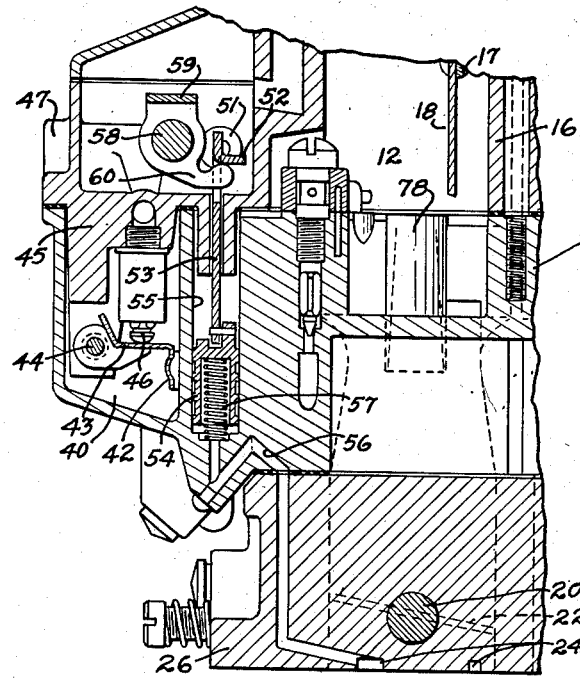
Fig. 3 is a half transverse vertical section taken on line 3—3 of Fig. 1.

Formed along the forward side and around the ends of the front pair of mixture conduits 11 and 12 and terminating substantially between the pairs is a fuel bowl 40 within which fuel is maintained at a substantially constant level, as is well known, by a pair of floats 41 connected by a yoke 42 from which centrally projects a lip 43 (Figs. 2 and 3) pivoted at 44 to bowl cover structure 45 and operably engaging needle valve 46 controlling the supply of fuel from the usual fuel pump (not shown) through threaded inlet connection 47.

Figure 4:
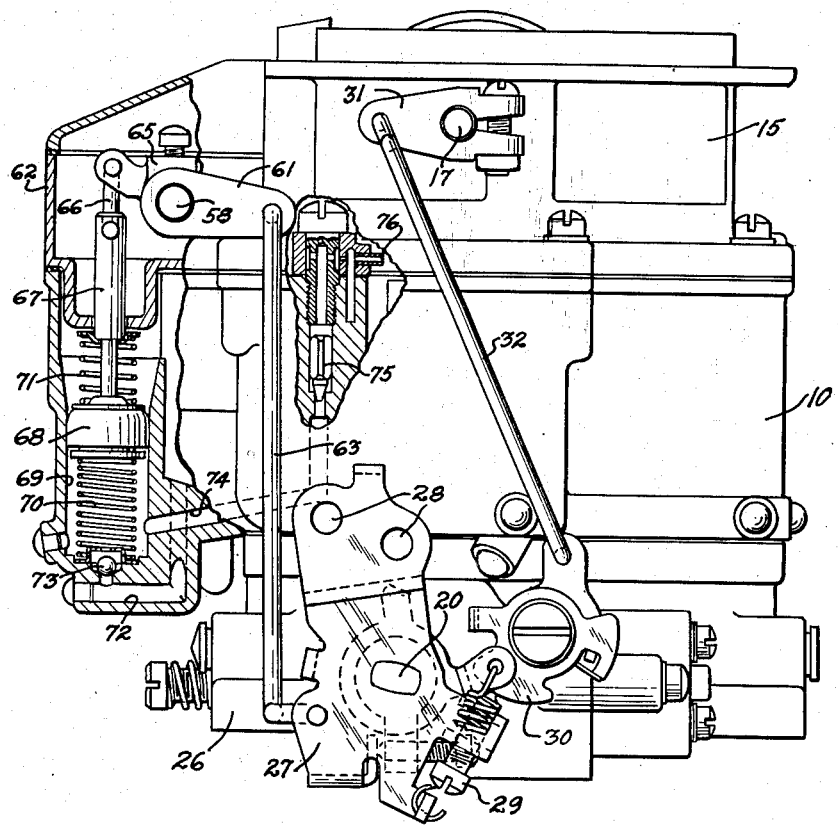
Fig. 4 is a side view of the carburetor, portions being broken away and underlying structure sectioned for clearer illustration.

In the lower, central, forward portion of the fuel bowl there are provided a pair of main metering orifices 50 controlled by metering pins 51 carried by a cross-bar 52 projecting laterally from a stem 53 in turn projecting upwardly from a piston 54 working in a cylinder 55 connected at its lower extremity by a passage 56 to slot 24 and thence to both main mixture barrels 11 and 12 posterior to throttle valves 22 therein. Piston 54 is constantly urged upwardly by a coiled spring 57. Journalled in bearings adjacent cross-bar 52 is a countershaft 58 to which is rigidly secured an arm 59 having a lip 60 underlying cross-bar 52. As shown in Figs. 1 and 4, a lever 61 is rigidly secured to the end of countershaft 58 outside of cover 62 and is connected by a link 63 to throttle operating crank 27. The arrangement is such that a drop of suction in the engine intake manifold permits coiled spring 57 to urge piston 54, cross-bar 52 and metering pins 51 upwardly so as to increase the effective openings in main metering orifices 50. Also, opening of main throttle valves 22 acts through finger 60 to cause upward movement of metering pins 51. This combination vacuum and manual metering system is covered in Read Patent No. 2,208,702 and Cloedy et al. Patent No. Re. 21,610.

Also rigidly secured to countershaft 58 within cover structure 62 is a second arm 65 connected by link 66 and shaft 67 to an accelerating pump piston 68 working in pump cylinder 69. Compression springs 70 and 71 maintain the pump piston substantially free of operating slack. Upon closing movement of the main throttle valves, fuel is drawn into the pump from the fuel bowl through an inlet passage 72 past inlet check 73. Upon opening of the main throttle valves, fuel is discharged by the pump through outlet passage 74 past outlet check 75 and into the main mixture barrel through diverging pump jets 76. No accelerating fuel is supplied to auxiliary barrels 13 and 14.

A pair of main fuel passages 77 (Fig. 2) extend rearwardly and upwardly from main metering orifices 50 and open into primary venturi tubes 78 in main mixture barrels 11 and 12 by means of nozzles 79. An anti-percolating well 80 extends vertically from the lower portion of inclined passage 77 and, at its upper extremities connects through a cross-passage 81 to the nozzle. This anti-percolator construction is covered in Carlson Patent No. 2,013,787. Depending into anti-percolator well 80 is an idle metering tube 82 connected by passage 83 to idling ports 84 adjacent and posterior to main throttle disks 22 when closed. These ports, being located centrally of the forward walls of the main pair of mixture barrels, may be connected to the main fuel nozzles by relatively direct, vertical and transverse passage portions. An adjusting screw 84a is provided for controlling the richness of the idling fuel mixture.

Figure 5:
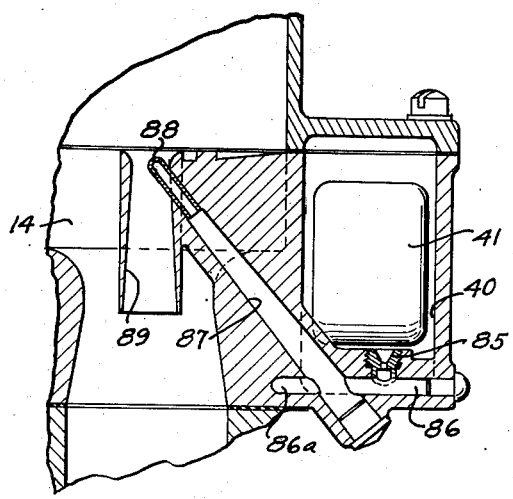
Fig. 5 is a detail section on broken line 5—5 of Fig. 1.

Located at the extreme side portions of the fuel bowl are additional fuel metering orifices 85 which, as shown best in Fig. 5 are connected by short, inward cross passages 86 to auxiliary main fuel passages 87 inclined rearwardly, inwardly and upwardly into auxiliary barrels 13 and 14 and terminating through nozzles 88 in primary venturi tubes 89. Each set of idling ports 90 in the auxiliary barrels, being located remotely from the corresponding metering orifice 85 and fuel passage 87, is connected to said passage 87 by an upward passage 91, depending orifice tube 92 in well 93, passage 94 extending inwardly along the lower edge of the fuel bowl in a boss 95, and a forward passage 96 in boss 97 connecting to extension passage 86a (Fig. 5). These idling passages, of course, are duplicated for each auxiliary mixture barrel. No adjustment is provided for the secondary idle ports, the adjusting screw 84a being utilized to control the richness of the total idling fuel supplied by a pair of barrels. This arrangement is feasible where both such barrels open into a common intake manifold.

In operation, the idling systems will be in operation at all times when the controlling throttle valves are closed. However, auxiliary throttle disks 23 start to open only after main throttle valves 22 have been opened about one-half. During the last half of the opening of the main throttle valves, the auxiliary throttles will reach full open so that at high speed operation all four mixture barrels will be wide open. Since the single fuel bowl is located, substantially, at the front of the group of barrels, all fuel supplied through both the main and auxiliary fuel nozzles will be desirably increased, upon acceleration due to rearward surging of the fuel in the bowl. Main fuel orifices 50 are located as closely as possible to the front wall of the body to reduce any tendency to lean out the fuel supplied therethrough during such rearward surging of the fuel in the bowl. Of course, there is a constant circulation of liquid fuel within the single bowl, even though the auxiliary barrels may not be in operation during long periods. Furthermore, the total volume of stored liquid fuel in the constant level chamber is substantially less than in the case of the concentric or dual bowl arrangements, resulting in reduced surging difficulties, while remaining adequate for the needs of the carburetor.

The invention may be modified in various respects as will occur to those skilled in the art and the exclusive use of all modifications as come within the scope of the appended claims is contemplated.

I claim:

1. In a carburetor, at least two pairs of downdraft, mixture conduits grouped compactly side by side, a constant level chamber having a middle part extending along the side of one of said pairs of conduits and end parts disposed at the ends of said pairs and terminating adjacent the ends of the other pair of conduits, a pair of main fuel nozzles extending from said middle part of said chamber, respectively, into said first pair of conduits, and a second pair of main fuel nozzles each extending from one of said chamber end parts into the adjacent one of said second pair of conduits.

2. In a four barrel carburetor, a pair of main mixture conduits disposed side by side along the front of the carburetor, a pair of auxiliary mixture conduits arranged transversely immediately behind said main conduits, a constant level chamber extending along the front and sides of said conduits and terminating between said pairs, main fuel nozzles extending from the forward portion of said chamber rearwardly into said main pair of conduits and other main fuel nozzles extending from the side portions of said chamber, respectively, into said auxiliary pair of conduits.

3. In a carburetor, a body including a group of four downdraft mixture conduits with forward and rear pairs, a constant level chamber extending along the front and sides of said group and terminating substantially between said front and rear pairs, main and idling fuel nozzles extending from the central, forward part of said chamber into said forward pair of conduits and other main fuel nozzles extending from the side portions of said chamber rearwardly and inwardly into said rear pair of conduits.

4. In a carburetor, a rectangularly arranged group of four mixture conduits with front and rear pairs, throttle valves mounted on shafts each passing through and journalled in one of said pairs, a constant level chamber extending along the front and sides of said group and terminating on a line approximately between said pairs, main fuel passages extending upwardly and rearwardly from the central, forward part of said chamber into said front pair of conduits, idling fuel passages extending from said main passages to idling ports located in the forward walls of said front pair of conduits adjacent and posterior to the edges of the throttle valves therein when closed, other main fuel nozzles extending from the side portions of said chamber, rearwardly into said rear pair of conduits, and idling fuel passages extending from said second main fuel nozzles, respectively rearwardly along said rear pair of conduits, then transversely along the rear wall thereof and connecting with idling ports adjacent and posterior to the rear edges of the throttle valves therein when closed.

5. In a carburetor, a rectangularly arranged group of four downdraft mixture conduits with a forward, main pair and a rear auxiliary pair, a constant level chamber extending across the front and side walls of said forward pair and terminating substantially between said pairs, main fuel metering orifices located in the lower, central, forward portions of said chamber, auxiliary metering orifices located in the bottom of the extreme side portions of said chamber, floats in said side portions and a fuel inlet needle valve controlled thereby, main fuel nozzles extending from said main metering orifices rearwardly into said main pair of conduits, and auxiliary main fuel nozzles extending from said auxiliary metering orifices rearwardly and inwardly into said rear pair of conduits.

References Cited in the file of this patent

UNITED STATES PATENTS

| | | |
|---|---|---|
| 2,358,435 | Ball | Sept. 19, 1944 |
| 2,379,288 | Ericson | June 26, 1945 |
| 2,420,925 | Wirth | May 20, 1947 |